United States Patent [19]
Pelka

[11] Patent Number: 6,007,209
[45] Date of Patent: Dec. 28, 1999

[54] LIGHT SOURCE FOR BACKLIGHTING

[75] Inventor: David G. Pelka, Los Angeles, Calif.

[73] Assignee: Teledyne Industries, Inc., Los Angeles, Calif.

[21] Appl. No.: 08/820,097

[22] Filed: Mar. 19, 1997

[51] Int. Cl.⁶ .................................................. G01D 11/28
[52] U.S. Cl. ............................ 362/30; 362/246; 362/247; 362/248; 362/800
[58] Field of Search ................................. 362/27, 30, 23, 362/28, 29, 245, 246, 247, 248, 252, 800; 313/110; 359/40

[56] References Cited

U.S. PATENT DOCUMENTS

| | | |
|---|---|---|
| Re. 33,987 | 7/1992 | Suzawa ........................................ 359/49 |
| 1,734,834 | 11/1929 | Steward et al. . |
| 2,761,056 | 8/1956 | Lazo . |
| 2,907,869 | 10/1959 | Hudson et al. . |
| 3,223,833 | 12/1965 | Protzmann . |
| 3,349,234 | 10/1967 | Schwarz . |
| 3,586,851 | 6/1971 | Rudolph et al. ........................ 362/293 |
| 3,957,351 | 5/1976 | Stockwell ................................. 359/49 |
| 4,011,001 | 3/1977 | Moriya . |
| 4,043,636 | 8/1977 | Eberhardt et al. ...................... 350/160 |
| 4,118,110 | 10/1978 | Saurer et al. ............................. 359/48 |
| 4,183,628 | 1/1980 | Laesser et al. ........................... 359/48 |
| 4,195,915 | 4/1980 | Lichty et al. . |
| 4,212,048 | 7/1980 | Castleberry . |
| 4,252,416 | 2/1981 | Jaccard . |
| 4,440,474 | 4/1984 | Trcka . |
| 4,453,200 | 6/1984 | Trcka et al. . |
| 4,528,617 | 7/1985 | Blackington ............................ 362/32 |
| 4,560,264 | 12/1985 | Kitazawa et al. ...................... 354/219 |
| 4,616,295 | 10/1986 | Jewell et al. ............................. 362/31 |
| 4,649,462 | 3/1987 | Dobrowolski et al. ................ 362/273 |
| 4,706,173 | 11/1987 | Hamada et al. ........................ 362/341 |
| 4,720,706 | 1/1988 | Stine ....................................... 340/783 |
| 4,723,840 | 2/1988 | Humbert et al. ....................... 350/345 |
| 4,735,495 | 4/1988 | Henkes ................................... 362/345 |
| 4,737,896 | 4/1988 | Mochizuki et al. .................... 362/328 |
| 4,766,526 | 8/1988 | Morimoto et al. ..................... 362/255 |
| 4,798,448 | 1/1989 | van Raalte ............................. 350/345 |
| 4,826,294 | 5/1989 | Imoto ..................................... 350/345 |
| 4,914,553 | 4/1990 | Hamada et al. ........................ 362/32 |
| 4,945,349 | 7/1990 | Sanai ..................................... 340/784 |
| 4,998,804 | 3/1991 | Horiuchi ................................ 350/334 |
| 5,008,658 | 4/1991 | Russay et al. .......................... 340/784 |
| 5,029,045 | 7/1991 | Sanai et al. ............................. 362/26 |
| 5,029,986 | 7/1991 | De Vaan ................................. 350/338 |
| 5,050,946 | 9/1991 | Hathaway et al. ...................... 385/33 |
| 5,070,431 | 12/1991 | Kitazawa et al. ...................... 362/31 |
| 5,128,783 | 7/1992 | Abileah et al. ......................... 359/49 |
| 5,161,041 | 11/1992 | Abileah et al. ......................... 359/40 |
| 5,202,950 | 4/1993 | Arego et al. ........................... 385/146 |
| 5,440,197 | 8/1995 | Gleckman .............................. 313/110 |
| 5,485,291 | 1/1996 | Qiao et al. .............................. 359/49 |
| 5,575,549 | 11/1996 | Ishikawa et al. ....................... 362/31 |
| 5,655,832 | 8/1997 | Pelka et al. ............................. 362/296 |

FOREIGN PATENT DOCUMENTS

| | | |
|---|---|---|
| 0 403 764 A1 | 12/1990 | European Pat. Off. . |
| 0 442 529 A2 | 8/1991 | European Pat. Off. . |
| 0 531 939 A1 | 3/1993 | European Pat. Off. . |
| 0 733 928 A2 | 9/1996 | European Pat. Off. . |
| 2 283 849 | 5/1995 | United Kingdom . |
| WO 92/13232 | 8/1992 | WIPO . |

*Primary Examiner*—Alan Cariaso
*Assistant Examiner*—Michael J. Smith
*Attorney, Agent, or Firm*—Robert J. Pugh; Patrick J. Viccaro; Allegheny Teledyne, Inc.

[57] ABSTRACT

A light source for a display panel of the type used in notebook computers. The light source consists of a housing having diffusively reflecting bottom and side interior surfaces that form a cavity. The housing defines an aperture that is juxtaposed with a rear surface of the display panel. A first series of LEDs is mounted within the cavity around the perimeter of the aperture and is shielded from the aperture by perimeter baffles that extend around the periphery of the aperture. A second series of LEDs is mounted within the cavity on the bottom wall of the housing. A series of baffles is interposed between the second series of LEDs and the aperture. A series of light quality enhancing films is interposed between the cavity and the display panel. The light source produces light of a uniform character with relatively high intensity and whiteness.

22 Claims, 6 Drawing Sheets

LIGHT SOURCE FOR BACKLIGHTING

BACKGROUND OF THE INVENTION

The present invention relates to a backlighting apparatus for visual displays, particularly for flat panel monitors, such as utilized in notebook computers.

A typical flat panel monitor utilizes an LCD as a means of displaying information. LCDs, which allow the display of alphanumeric, graphic or other information, may comprise a medium whose transmittance changes in response to the application of an electrical potential across the medium. The LCDs may be viewed even in an otherwise dark environment by applying illumination uniformly to their rear face. An exemplary backlighting apparatus for an LCD is disclosed in U.S. Pat. No. 4,043,636.

It is desirable for a backlight for LCDs, such as those found in notebook computers, to have certain attributes. Notebook computers are often used during travel and in areas with little light, such as trains and airplanes. Hence, it is desirable that LCDs have an acceptable level of brightness so that the user can easily read the information on the display.

Furthermore, software applications that are used on notebook computers often display color images. Hence, it is preferable that the display have a spectral content that is compatible with the colors displayed on the LCD. It is also desirable that the light source for the monitor be compact so that it will not significantly increase the size and weight of the computer, as notebook computers are frequently used during travel and must often be carried by a user.

Lastly and importantly, the lighting system should provide uniform illumination across the entire area of the display. In particular, the light emerging from the light source should be substantially featureless and free of distortions such as holes or rings. In practice, the requirement of uniform illumination is difficult to achieve, and prior art devices frequently fail to provide a sufficiently uniform source of illumination for LCD displays.

There is thus a need for a simple, compact, lightweight device for backlighting a display panel, particularly an LCD display panel, which provides highly uniform, high-intensity illumination of the entire display panel.

SUMMARY OF THE INVENTION

The light source of the present invention backlights a rear surface of a display panel, and includes a housing having a cavity formed by diffusely reflective bottom and side interior surfaces. The mouth of the cavity forms an aperture which is juxtaposed with the rear surface of the display panel. Illumination is provided by light emitting devices that are shielded by shielding elements. The emitting devices and shielding elements are positioned such that the emitted light is substantially uniformly distributed throughout the cavity, thereby eliminating bright spots (i.e., "hot spots") in the display panel.

In one embodiment of the invention, a first series of LEDs is mounted about the periphery of the aperture. Preferably, the first series of LEDs illuminates the perimeter portion of the aperture and thereby provides a backlighting for the perimeter area of the display panel. In the preferred embodiment, the shielding elements comprise peripheral baffles that extend from the edge of the aperture a short distance into the cavity to prevent the LEDs from being viewed through the aperture. The baffle prevents the first series of LEDs from directly illuminating the aperture, thereby preventing the LEDs from creating "hot spots" in the display.

A second series of LEDs is mounted on the bottom wall of the cavity directly below the aperture. The second series of LEDs illuminates the central area of the aperture that is not illuminated by the first series of LEDs, and thus, the second series of LEDs provide backlighting for the central area of the display panel. The shielding elements preferably further comprise a series of baffles mounted on the bottom wall such that a baffle portion extends between each LED and the aperture. The baffles prevent the second series of LEDs from directly illuminating the aperture (or being directly viewed through the aperture) and thereby prevent the second series of LEDs from creating "hot spots" in the display panel.

Each of the LED's of the preferred embodiment produces light that is colored (e.g., red, blue or green). The colors and positions of the first and second series of LEDs are selected so that in combination, the LEDs will produce light that is substantially white in color. Alternatively, white light LEDs, such as are available from Nichia Corporation of Tokyo, Japan, may be utilized. The light that is produced by the LEDs is diffusely reflected within the interior surfaces of the cavity, which desirably results in a uniform distribution of light exiting through the aperture.

In a preferred embodiment, a series of light quality enhancing films is interposed between the cavity and the display panel. The series of films includes a diffuser that is mounted across the aperture such that light must first pass through the diffuser before exiting the aperture of the cavity. The diffuser acts to diffuse the light that passes from the cavity through the aperture and towards the rear surface of the display panel. The series of films also includes a brightness enhancing film (BEF) that is interposed between the diffuser and the display panel. The BEF serves to increase the intensity of the light within a desired viewing angle and thereby improves the intensity of the display panel illumination throughout the viewing angle. If desired, the series of films may also include a color filter that is positioned between the BEF and the display panel. The color filter changes the spectral characteristics of the light and preferably provides a light that is whiter in color. In combination, the light quality enhancing films desirably function to enhance the illumination of the display panel by providing a uniform output of white light of sufficient intensity throughout a desired viewing angle.

The invention also encompasses a method of backlighting a display panel comprising the step of producing illumination from a substantially lambertian light source having a cavity with internal side walls, an internal bottom wall, and an aperture. The producing step comprises the step of directing light rays emitted by plural light sources mounted on the cavity bottom surface and around the perimeter of the aperture into the cavity such that the light exiting the aperture is substantially uniform in intensity and color. The method also includes the steps of using a diffuser to diffuse light from the substantially lambertian light source and using a brightness-enhancing film to concentrate the diffused light into a predetermined angular range without significantly reducing the uniformity of the diffused light, and directing the concentrated, diffused light onto the display panel.

Hence, the backlighting apparatus of the preferred embodiment produces illumination of a very uniform character, with relatively high intensity and whiteness, in a device that is both simple and compact.

DETAILED DESCRIPTION OF THE PREFERRED EMBODIMENTS

Figure 1:
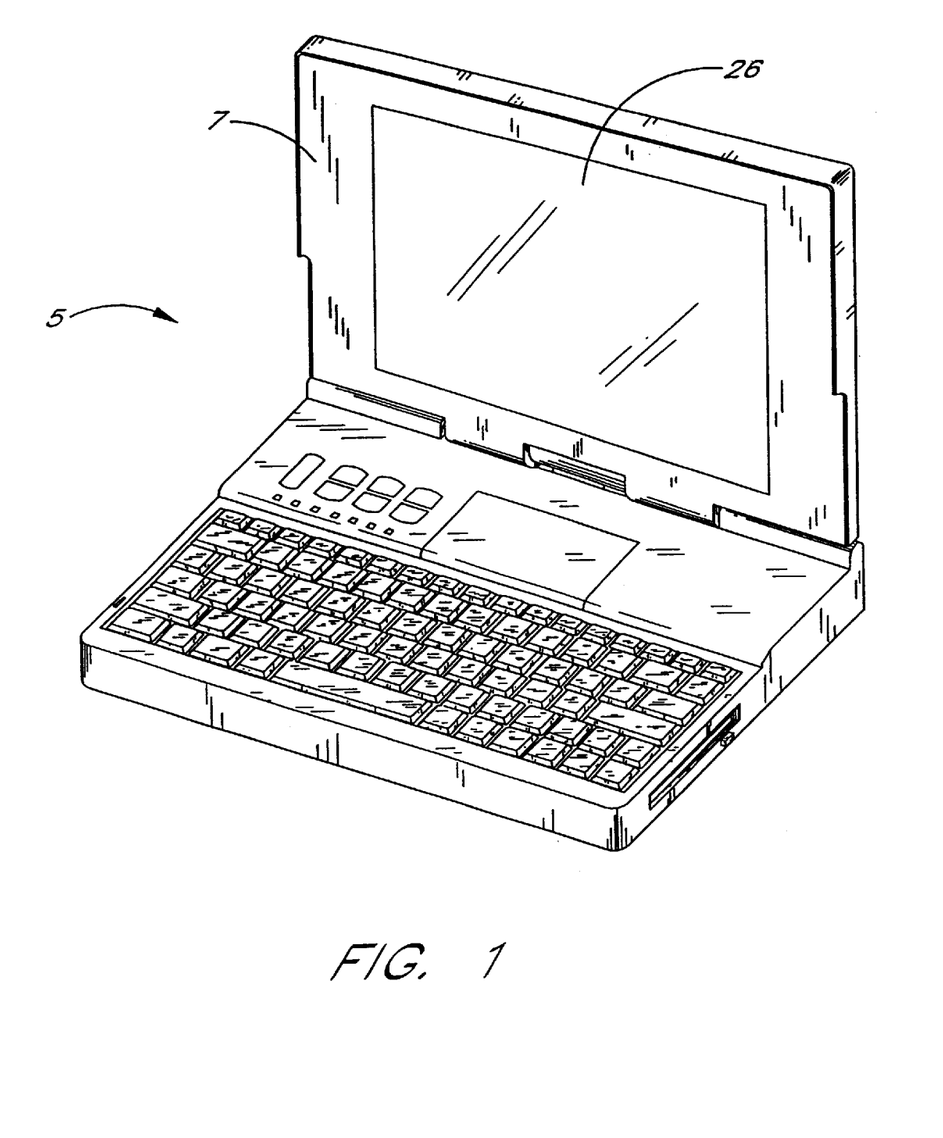
FIG. 1 is a perspective view of a notebook computer incorporating an LCD backlit by the light source of the present invention.

As shown in FIG. 1, a preferred embodiment of the present invention comprises a notebook computer 5 with a flat panel display 26 for displaying alphanumeric, graphic or other information. The display 26 is supported by a casing 7 of the notebook computer 5. The display 26 comprises an LCD with a front face, which is viewable by a user, and a rear face of identical size. By way of example, the flat panel display 26 may be rectangular, having a viewable length of 8" and a viewable width of 6".

Figure 2:
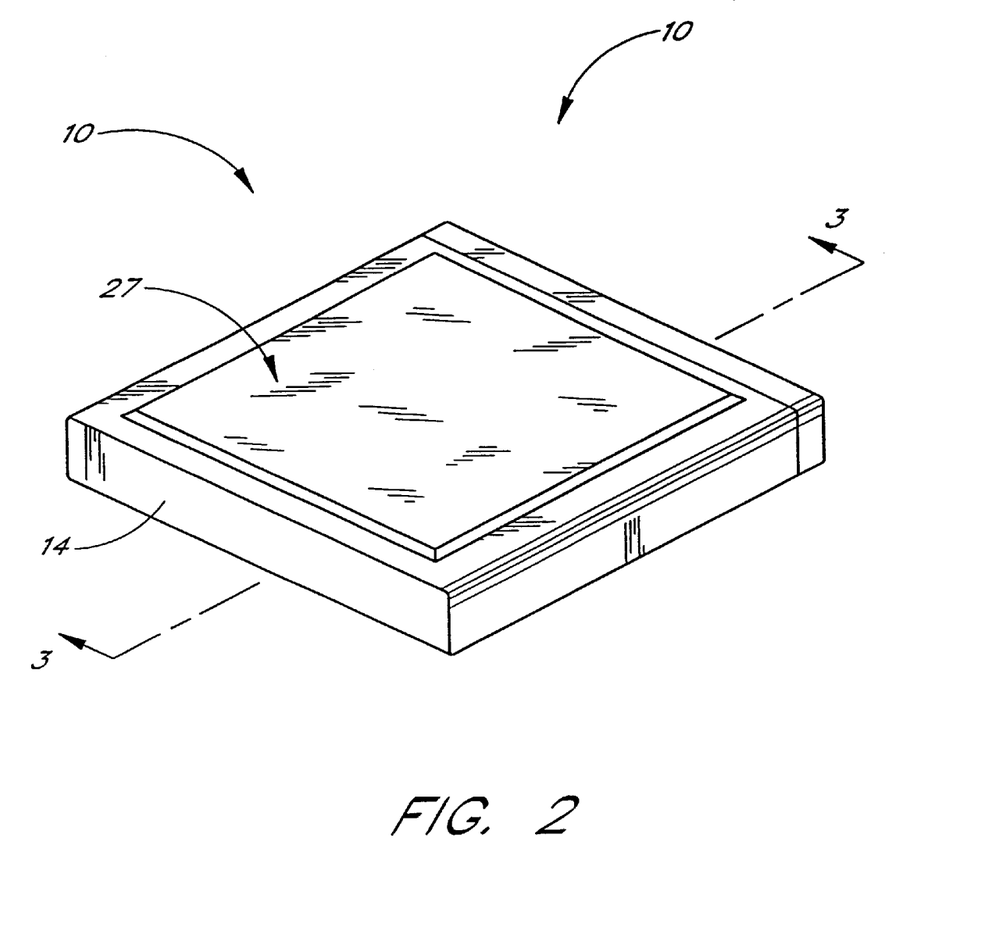
FIG. 2 is a perspective view of the light source of the preferred embodiment.
Figure 3:
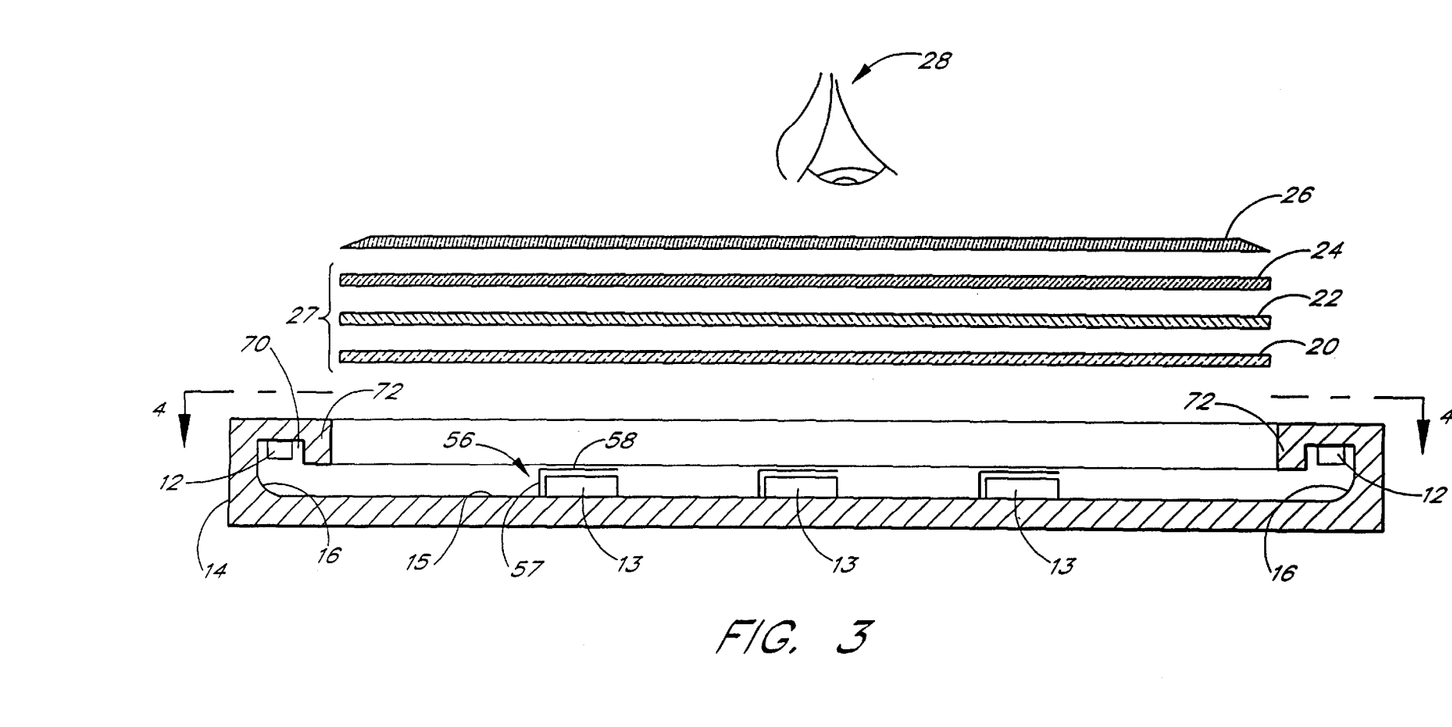
FIG. 3 is a cross-sectional view of the light source of FIG. 2 taken along the lines 3—3 of FIG. 2.
Figure 4:
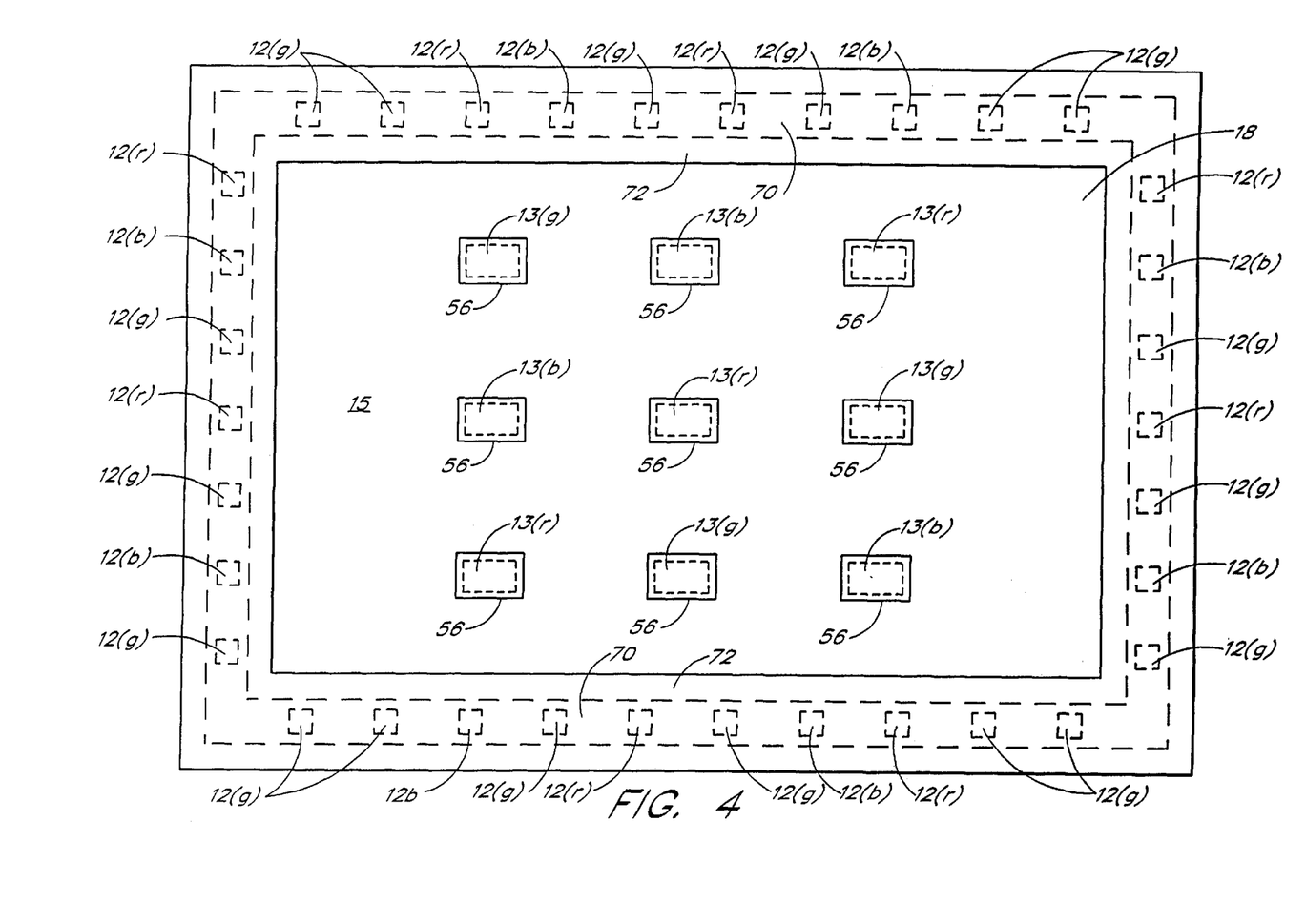
FIG. 4 is a plan view of the light source of FIG. 3 taken along the lines 4—4 of FIG. 3.

Referring to FIGS. 2 to 4, the flat panel display 26 is illuminated by a backlighting apparatus 10, which is mounted within the casing 7 of the notebook computer 5, rearward of the flat panel display 26. As best seen in FIGS. 3 and 4, the backlight apparatus 10 is comprised of a first and second series of red, blue and green light emitting diodes (LEDs) 12 and 13, located within a housing 14 having an aperture 18 which opens into a cavity. The aperture 18 is covered by a diffuser 20, a brightness enhancing film (BEF) 22, and, if desired, a color filter 24. The diffuser 20, BEF 22, and color filter 24 (if present) are placed in physical contact with each other, forming a planar structure hereinafter referred to as a light quality enhancing (LQE) apparatus 27 (the gaps between elements 20, 22, and 24 in FIG. 3 are depicted only for clarity; the thicknesses of and separation between each of the various elements are minimized for the sake of compactness). The LCD display 26, which is backlit by light emerging through the aperture 18 from interior cavity surfaces 15 and 16, is juxtaposed with the LQE apparatus 27, so that the display 26 may be viewed from a position 28.

In one embodiment of the present invention, the housing 14 of the backlighting apparatus 10 has lateral internal dimensions of 6¼"×8¼", and the thickness or depth of the housing is ½". The aperture 18 is preferably large enough to illuminate a display screen on a notebook computer. In the illustrated embodiment, the aperture 18 is 6"×8", which corresponds to the dimensions of the display screen 26. It will be appreciated by those skilled in the art that the dimensions of the housing and aperture could be varied to suit various display sizes.

As illustrated in FIGS. 3 and 4, the housing 14 comprises a diffusively reflecting cavity having an interior cavity bottom wall 15, and interior cavity side walls 16. The mouth of the cavity forms the aperture 18 which opens into the cavity. The interior cavity walls 15 and 16 preferably have a reflectivity of at least 88%. To this end, the interior surfaces 15 and 16 may be coated with white house paint or more exotic materials such as the Labsphere Corporation's Spectraflect paint. Spectraflect paint's reflectivity is considerably higher than house paint, roughly 98%, while the reflectivity of white house paint is approximately 92%. Additionally, the housing 14 may be entirely constructed from a diffusely reflecting material, such as $TiO_2$ pigmented Lexan™ polycarbonate or Spectralon™ plastic, thereby avoiding the need to apply a separate coating to the interior surfaces 16 of the housing 14. The reflectivity of Spectralon™ plastic is about 99%.

A first series of red, green, and blue LEDs 12(r), 12(g) and 12(b), respectively, are mounted around the periphery of the aperture 18 within a channel 70 that extends around the entire perimeter of the aperture 18. The LEDs that are mounted around the periphery of the aperture shall be referred to collectively by the reference numeral 12, and individually by an (r), (g), or (b) suffix.

The channel 70 is formed by peripheral baffles 72 that extend from the edge of the aperture 18 a short distance into the cavity on each side thereof. The baffles 72 thus extend around the entire perimeter of the aperture 18. Preferably, the distance by which the baffles 72 extend into the cavity is no greater than is necessary to prevent the LEDs from being viewed through the aperture 18. In the preferred embodiment, the baffles 72 are spaced from respective cavity walls 16 to permit light from the LEDs to diffusively reflect and illuminate the aperture 18 at least 2" inward from its perimeter.

The LEDs 12 are positioned around the periphery of the aperture 18 so that for each color (red, blue, green), the combined light output from the LEDs 12 is distributed across the aperture 18 substantially uniformly with respect to intensity. Further, the LEDs are arranged so that the red, blue, and green light from the LEDs is mixed together in a manner well known in the art to produce substantially white light. In the preferred embodiment, the LEDs 12 are positioned symmetrically around the periphery of the aperture 18, with an equal number of LEDs 12 of like color on opposite edges of the rectangular aperture 18. Thus, as viewed from FIG. 4, the top edge of the aperture 18 has six green diodes 12(g), two red diodes 12(r), and two blue diodes 12(b), while the bottom edge of the aperture also has six green diodes 12(g), two red diodes 12(r), and two blue diodes 12(b). The left edge of the aperture 18 has two red diodes 12(r), three green diodes 12(g), and two blue diodes 12(b). Similarly, the right edge of the aperture 18 has two red diodes 12(r), three green diodes 12(g), and two blue diodes 12(b). The diodes lying along a common edge are preferably spaced apart from each other by an equal distance. It will be appreciated by those skilled in the art that the number, spacial arrangement, and color arrangement of the LEDs 12 may be varied to suit apertures of various sizes.

A second series of red, green, and blue LEDs 13(r), 13(g), and 13(b), respectively, are mounted on the bottom wall 15 of the cavity such that the LEDs 13 are directly within the viewing aperture portion (as used herein, the term "viewing aperture portion" refers to the portion of the cavity that lies directly beneath the aperture 18). The LEDs that are mounted on the bottom wall 15 of the cavity shall be referred to collectively by the reference numeral 13, and individually by an (r), (g), or (b) suffix. As shown in FIG. 4, the LEDs 13 are arranged in a series of rows and columns along the bottom wall 15.

The LEDs 13 are spaced to illuminate the interior portion of the aperture that is not illuminated by the perimeter LEDs 12. For the particular embodiment shown in FIG. 4, in which the aperture has dimensions of 6"×8", the LEDs are arranged in a series of three rows with three LEDs per row.

For the particular embodiment illustrated in FIG. 4, columns of LEDs 13 are spaced 1½" apart from adjacent columns, and each row is spaced ½" apart from an adjacent row. LEDs 13 adjacent to the perimeter of the aperture 18 are spaced 2½" from the baffle 72. The LEDs 13 are arranged so that the red, blue, and green light from the LEDs is mixed together in a manner well known in the art to produce white light. In the preferred embodiment, the LEDs within a particular row alternate in sequential order between the colors of red, blue and green. Furthermore, the colors of LEDs within a particular row are shifted with respect to adjacent rows. Thus, as viewed in FIG. 4, the top row includes, from left to right, a green diode 13(g), a blue diode 13(b), and a red diode 13(r). The second row includes a blue diode 13(b), a red diode 13(r), and a green diode 13(g). The third row includes a red diode 13(r), a green diode 13(g), and a blue diode 13(b). As shown in FIG. 4, this arrangement causes the LEDs in each column to also alternate in a sequential order of red, blue and green.

Figure 5:
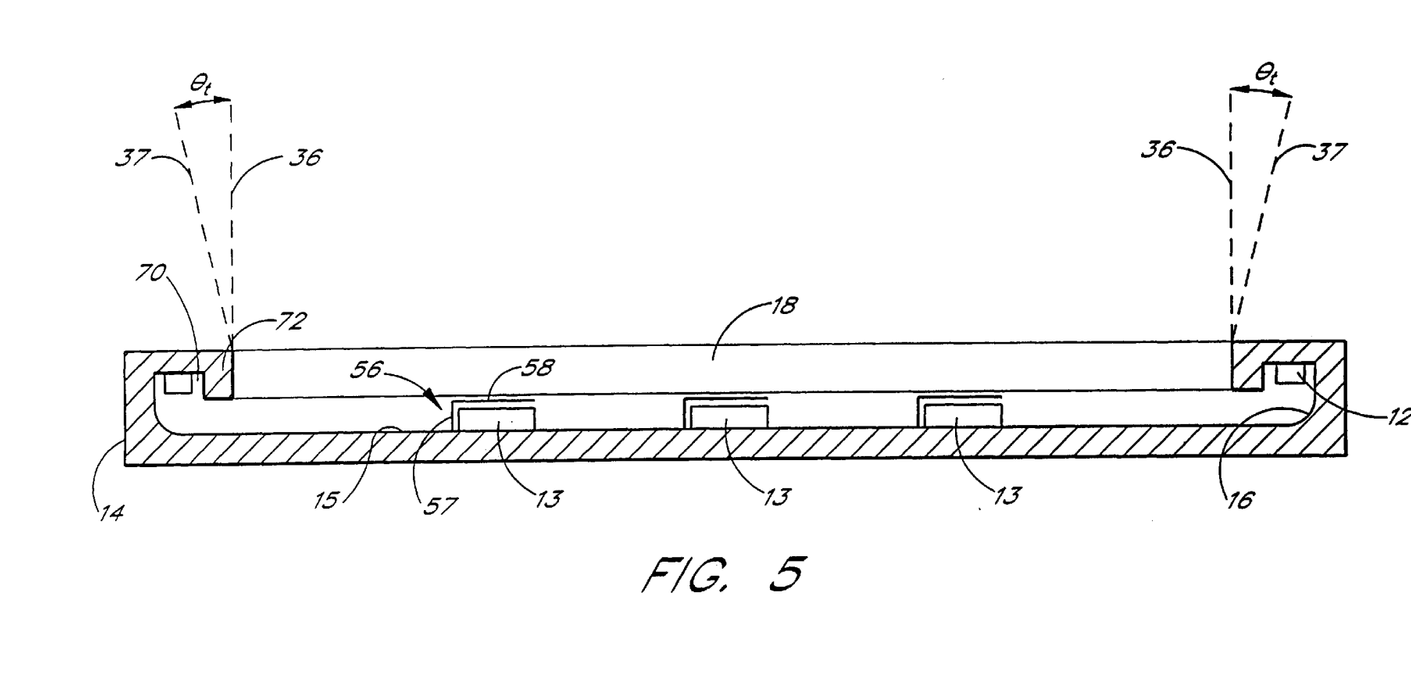
FIG. 5 is a cross-sectional view of the light source of FIG. 2.

In the preferred embodiment, each of the LEDs 13 within the viewing aperture portion is shielded from the aperture 18 by a shielding element comprising an opaque baffle 56. Referring to FIG. 5, each baffle 56 consists of two portions, a support portion 57, and a shield portion 58. The support portion 57 extends from the interior bottom wall 15 in a direction substantially normal to a plane defined by the bottom wall 15. The shield portion 58 preferably extends in a direction parallel to a plane defined by the bottom wall 15 and is disposed between each LED 13 and the aperture 18.

The baffles 56 have outer surfaces that face away from the LEDs 13. The outer surfaces of the baffles 56 are comprised of or coated with one of the diffusely reflecting materials which are described above. The inner surfaces of the baffles, which face the LEDs, are also comprised of or coated with one of the diffusely reflecting materials described above. Alternatively, the inner surfaces of the baffles may have mirrored surfaces. In either case, the reflecting surfaces reflect light from the LEDs toward the bottom wall 15.

The baffles 56, which are interposed between the LEDs 13 and the aperture 18, prevent the LEDs 13 from directly illuminating the aperture 18, while reflecting light incident thereon, such as any rays reflected back toward the aperture from the diffuser 20 and the BEF 22, thus preserving the uniformity of the light distribution. Hence, the baffles 56 effectively serve to prevent the LEDs 13 from creating individual spots of relatively high intensity light (i.e., "hot spots") on the display.

As is typical of light-emitting diodes, the LEDs 12 and 13 comprise tiny cubes of solid-state material that emit light. In the embodiment shown, the solid-state material is not encased in a housing, and no directional reflectors are used such that the emission is allowed to propagate multidirectionally from plural faces or facets of the solid-state cubes. Such multifaceted emission enhances the uniformity of the intensity of light exiting the aperture 18.

The light emitted from the multifaceted cubes typically undergoes several reflections within the cavity formed by the housing 14 before eventually emerging from the aperture 18. The multitude of diffuse reflections cause the interior surface of the housing 14 opposite the aperture 18 to be uniformly lit in the preferred embodiment, and the housing's cavity acts as a substantially lambertian source, i.e., a light source having the property that the radiance or brightness of the interior cavity surfaces is substantially constant as a function of viewing angle. As mentioned above, the LEDs 12 that are mounted around the periphery of the aperture 18 serve to illuminate the perimeter area of the aperture 18, at least 2" inward, while the LEDs 13 that lie within the viewing aperture portion illuminate the interior portion of the aperture 18 that is not illuminated by the LEDs 12.

While the housing 14 provides a source of substantially uniform intensity light even in the absence of the diffuser 20, in the preferred embodiment of the present invention the diffuser 20 removes residual nonuniformities such as cosmetic imperfections in the interior surfaces 16 of the cavity. The diffuser is comprised of translucent material, typically a readily available thin plastic surface or volume diffuser. Both of these materials are characterized by very low absorption, thus minimizing energy losses.

To avoid wasting optical energy, it is preferable to match the numerical aperture of the backlight with the numerical aperture of the optics that receives the light from the backlight. In the preferred embodiment, because the cavity acts as a substantially lambertian source, it is necessary to decrease the numerical aperture of the backlight, and thereby concentrate the light emanating from the aperture. In particular, the backlight 10 employs the BEF 22 (disposed between the diffuser 20 and the display 26) to concentrate the illumination within boundary lines 37 (FIG. 5), and thereby increase the brightness.

Referring to FIG. 5, the performance of BEF 22 can be characterized by an angle, $\theta_t$, which is the angle from a normal 36 to the viewing boundary line 37. Except for weak side lobes, no light will be transmitted by the BEF beyond the angle $\theta_t$. Thus, from an observer's perspective, the BEF will cause the light to be concentrated within a viewing angle $\theta_v$, which is equal to twice the angle $\theta_t$ of the BEF 22 (i.e., $\theta_v=2\theta_t$).

It will be understood that concentration of the illumination on sides of the BEF 22 (within the angle $\theta_t$), shown in FIG. 5, is symmetrical only in the sense that concentration occurs within a plane coincident with the plane of the paper in FIG. 5. The BEF 22 does not provide concentration within the orthogonal plane. In some applications of the invention, it is preferable to concentrate the illumination in both of the orthogonal planes. This may be accomplished by including a second BEF oriented orthogonally to the BEF shown in FIG. 5. Such an arrangement would provide a boundary line 37 at each of the four edges of the aperture 18 and thereby concentrate the illumination so that substantially no radiation beyond the angle $\theta_t$ is transmitted from the aperture 18.

Figure 6:
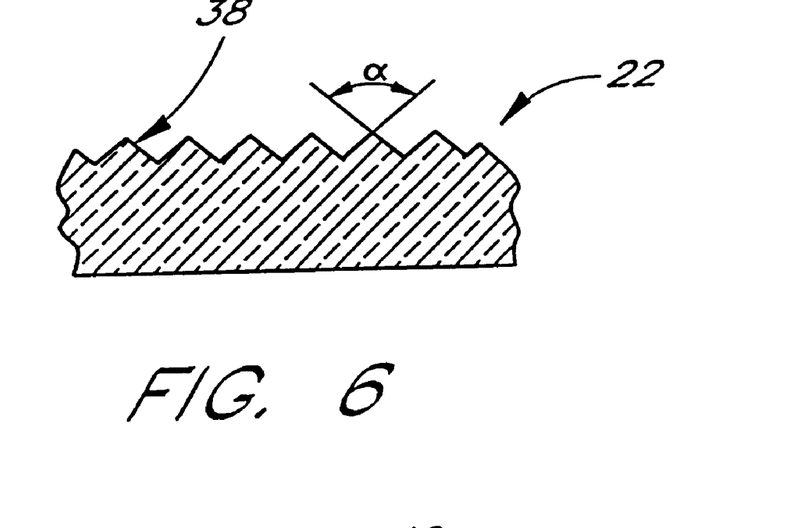
FIG. 6 is a fragmentary view in cross section, of a brightness enhancing film as shown in FIG. 3.

Referring to FIG. 6, the BEF of the preferred embodiment is a commercially available thin film having linear pyramidal structures 38. In principle, the structures 38 transmit only those rays from the cavity that satisfy the incidence angle criteria for transmission into the transmission region bounded by the boundary lines 37. All other rays will be reflected back into the cavity, where they are diffusely reflected again by the cavity walls. In effect, the reflected rays are "recycled" until they are incident on the BEF at an angle which permits them to pass through the BEF into the transmission region.

The fraction f of light retroreflected by the pyramidal structures 38 of the BEF 22 satisfies the relationship $1-f \approx \sin \theta_t$. The brightness-enhancing effect results from the fact that many of the retroreflected rays are themselves diffusely reflected and eventually are transmitted by the BEF 22. Because the BEF 22 is designed so that $\theta_t<90$ degrees, it concentrates light within the display range, thereby increasing the intensity of light seen within this range. Using pyramidal structures, a 40% gain over an unenhanced lambertian source has been observed. If a film having orthogonally oriented rows is used, a gain of as much as 80% may be possible. The use of orthogonally oriented films produces the enhancing effect in two orthogonal planes rather than only along the axis perpendicular to the pyramidal structures, as is the case when only one set of pyramidal structures 38 is used. In the preferred embodiment, the structure of the film is sufficiently fine that it is imperceptible to the viewer of the display 26 and the light intensity resulting therefrom is as uniform as possible. Referring to FIG. 6, the BEF 22 may be a film having an apex angle α (typically about 100°). Such film is available from 3M. As an alternative to two orthogonally oriented lenticular films of the Type shown in FIG. 6, an array of two-dimensional micro lenses may be utilized.

Figure 7:
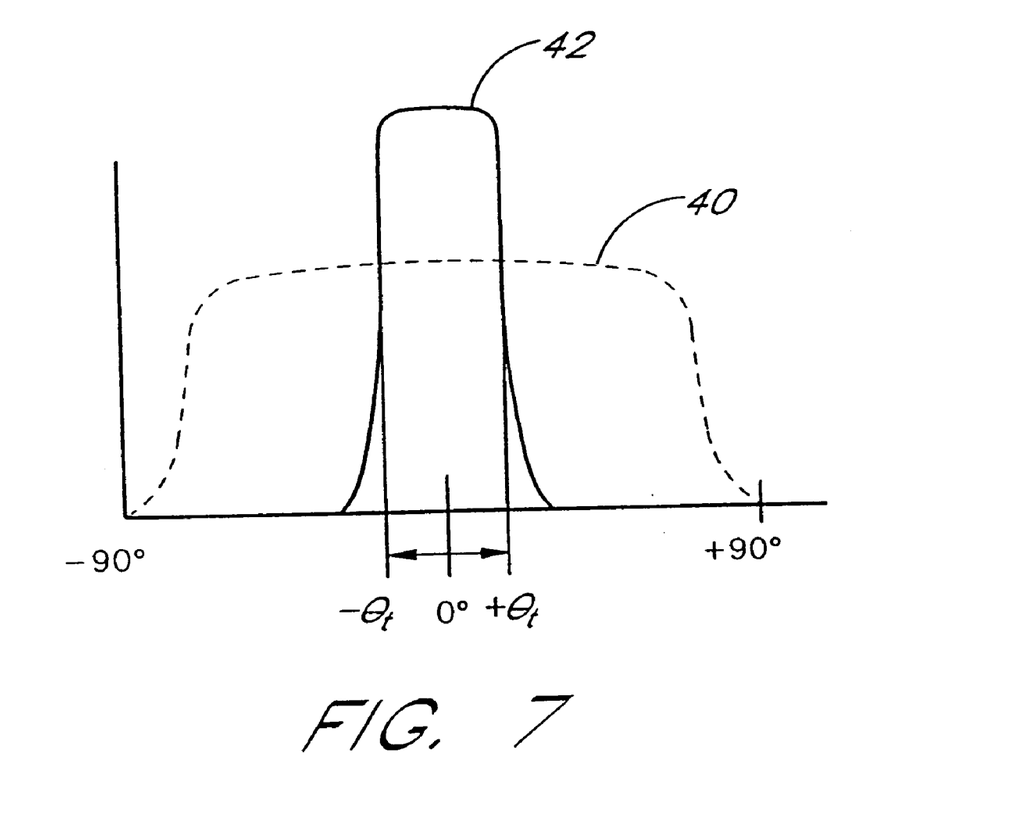
FIG. 7 is a graph showing the intensity of light emitted from the light source shown in FIG. 2 as a function of viewing angle.

The concentrating effect of the BEF 22 is depicted in FIG. 7, which is a graph of the brightness of light observed as a function of the angle between the normal 36 (FIG. 5) and the line of sight of the eye of an observer. Graph 40 illustrates the intensity without the BEF 22, while graph 42 shows the distribution achieved with the BEF 22. It can be seen that the intensity achieved within the window $\theta_v = 2\theta_t$ (typically $\leq 35°$) is greater than that achieved by use of the diffuser alone. It is also important to note that the BEF is placed between the diffuser and the display, since the diffuser has a spreading effect on the angular distribution of light, while the BEF concentrates it.

FIG. 7 also illustrates an advantageous feature of the present invention, namely the uniformity of the distribution of illumination throughout the viewing range. It can be seen from the graph 42 that the light intensity emerging from the BEF 22 is highly uniform throughout the entire viewing angle $\theta_v$.

In another embodiment of the present invention, white light is provided by white light LEDs such as are available from Nichia Corporation of Tokyo, Japan. A further embodiment utilizes incandescent light bulbs such as common flashlight lamps powered by a power source connected to wires. In this embodiment, the flashlight lamps are positioned in the cavity so that they are shielded by the baffles, in the same manner as the LEDs 12 and 13 described above. In both of these embodiments, the manner in which the light reflects within the cavity is substantially identical to the manner described above with respect to the LEDs 12 and 13.

In yet another embodiment of the invention, the light is provided by small fluorescent tubes. The fluorescent tubes are positioned in the cavity so that they are shielded by baffles in the same manner as the LEDs 12 and 13, as described above. Accordingly, the same principles will apply with respect to the light being reflected within the cavity and exiting through the aperture 18.

The color temperature of some light sources may not be ideal for achieving ideal color purity. In such case, a filter may be used to shift the color distribution as desired. As discussed, the color filter 24, if used, is interposed between the BEF 22 and the rear surface of the display panel. Light passing through the filter 24 continues through the LCD 26 to the eye of the viewer located at the position 28.

The present invention thus comprises a highly uniform, efficient, and compact light source for LCD displays utilized in notebook computers. It will be appreciated, however, that the present invention is not limited to notebook computers, but is also applicable to other types of flat panel displays. It is understood that the present disclosure of the preferred embodiment may be changed in the combination and arrangement of parts without departing from the spirit and scope of the invention hereinafter claimed.

What is claimed is:

1. An apparatus for backlighting a display panel, comprising:
   a housing having a cavity formed by diffusively reflective bottom and side surfaces, said housing having an aperture which opens into said cavity, said aperture configured to provide illumination to a rear surface of said display panel;
   a first series of light-emitting devices, mounted about a perimeter of the cavity;
   a second series of light-emitting devices, mounted in a predetermined pattern on said bottom surface of said cavity;
   a diffuser mounted across said aperture, so as to diffuse illumination which passes through said aperture from said cavity toward said display panel;
   a brightness enhancing material disposed between said diffuser and said display panel, said material concentrating illumination within a viewing angle so as to enhance the brightness of the display panel; and
   said housing further comprising shielding elements positioned relative to at least some of said light emitting devices of said first and second series such that light emitted by the shielded emitting devices is substantially uniformly distributed throughout said cavity, whereby hot spots in said display panel are effectively eliminated.

2. The apparatus of claim 1, wherein said shielding elements comprise a series of baffles mounted on the bottom surface of the cavity with at least a portion of each baffle interposed between one of the second series of light emitting devices and the aperture, whereby the shielded emitting devices are not directly viewable through the aperture.

3. The apparatus of claim 2, wherein the underside of the interposed baffle portion is substantially reflective so as to direct light incident thereon back towards the bottom surface of the cavity.

4. The apparatus of claim 3, wherein the shielding elements further comprise a peripheral baffle on each side of the cavity positioned within the cavity to prevent the first series of light emitting devices from being directly viewable through the aperture.

5. The apparatus of claim 1, wherein said first and second series of light emitting devices comprise LEDs.

6. The apparatus of claim 5, wherein said LEDs are white in color.

7. The apparatus of claim 5, wherein said LEDs are green, red or blue in color.

8. The apparatus of claim 7, wherein the predetermined patterns of the second series of LEDs comprises a grid in which the LEDs in each row alternate in color and the LEDs in each column alternate in color.

9. The apparatus of claim 1, wherein said first and second series of light emitting devices comprise incandescent light bulbs.

10. The apparatus of claim 1, wherein said first and second series of light emitting devices comprise fluorescent tubes.

11. The apparatus of claim 1, wherein said apparatus additionally comprises a color filter having characteristics which change the spectral content of the light illuminating said display panel.

12. The apparatus of claim 11, wherein the color filter is disposed between said cavity and said display panel.

13. The apparatus of claim 1, wherein the interior surfaces of said cavity are coated with white paint having a reflectance higher than 88 percent.

14. The apparatus of claim 13, wherein said series of baffles are coated with white paint having a reflectance higher than 88 percent.

15. The apparatus of claim 1, wherein the reflective interior surfaces of said housing further comprise high-reflectance plastic.

16. The apparatus of claim 1, wherein the series of baffles are constructed of high-reflectance plastic.

17. The apparatus of claim 1, wherein said brightness enhancing material comprises a film of linear pyramidal structures.

18. The apparatus of claim 17, wherein said brightness enhancing material further comprises a second film of linear pyramidal structures disposed in a direction orthogonal to said film of linear pyramidal structures.

19. The apparatus of claim 1, wherein said viewing angle is no more than about 35 degrees.

20. A method of backlighting a display panel, comprising:

producing illumination from a substantially lambertian light source comprising a cavity with internal side walls, an internal bottom wall, and an aperture, said step of producing illumination comprising the step of directing light rays emitted by plural light sources mounted on said internal bottom wall and around the perimeter of the aperture into the cavity such that the light exiting the aperture is substantially uniform in intensity and color;

using a diffuser to diffuse light from said substantially lambertian light source;

using a brightness enhancing film to concentrate the diffused light into a predetermined angular range without significantly reducing the uniformity of the diffused light; and directing the concentrated, diffused light onto said display panel.

21. The method of claim 20, further comprising the step of using a color filter to change the color temperature of said concentrated, diffused light.

22. A method of manufacturing a backlight for a flat panel display comprising:

mounting plural solid state light emitters in a diffusely reflecting cavity;

arranging the light emitters in a predetermined pattern on a bottom surface of the cavity;

exposing multiple facets of said light emitters to said cavity such that said light emitters emit light in multiple directions within the cavity;

shielding the light emitters so that substantially all light emitted by said light emitters is reflected at least once before exiting said cavity;

positioning a diffuser and a brightness enhancing film across a mouth of said cavity.

* * * * *